(12) United States Patent
Wright et al.

(10) Patent No.: US 12,210,443 B2
(45) Date of Patent: Jan. 28, 2025

(54) MULTI-CLIENT ORCHESTRATED AUTOMATED TESTING PLATFORM

(71) Applicant: Charter Communications Operating, LLC, St. Louis, MO (US)

(72) Inventors: Matthew James Wright, Denver, CO (US); Ethan Wright, Longmont, CO (US); Jason Page, Denver, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 0 days.

(21) Appl. No.: 17/466,848

(22) Filed: Sep. 3, 2021

(65) Prior Publication Data
US 2023/0071504 A1 Mar. 9, 2023

(51) Int. Cl.
*G06F 11/36* (2006.01)

(52) U.S. Cl.
CPC ...... *G06F 11/3688* (2013.01); *G06F 11/3692* (2013.01); *G06F 11/3696* (2013.01)

(58) Field of Classification Search
CPC ............. G06F 11/3688; G06F 11/3692; G06F 11/3696
See application file for complete search history.

(56) References Cited

U.S. PATENT DOCUMENTS

| | | | | |
|---|---|---|---|---|
| 7,000,224 | B1* | 2/2006 | Osborne, II | G06F 11/3688 717/125 |
| 2012/0174067 | A1* | 7/2012 | Locker | G06F 11/3688 717/124 |
| 2015/0178184 | A1* | 6/2015 | Hishioka | G06F 11/3688 717/124 |
| 2019/0052551 | A1* | 2/2019 | Barczynski | H04L 41/40 |
| 2021/0105597 | A1 | 4/2021 | Wright | |
| 2021/0250763 | A1 | 8/2021 | Wright | |
| 2021/0390039 | A1* | 12/2021 | Rodrigues | G06F 11/3688 |
| 2023/0305947 | A1* | 9/2023 | Chibon | G06F 11/3664 |

* cited by examiner

*Primary Examiner* — Wei Y Zhen
*Assistant Examiner* — Brahim Bourzik
(74) *Attorney, Agent, or Firm* — Otterstedt & Kammer PLLC

(57) ABSTRACT

A method for operating an automated testing platform includes providing a testing cloud application running on the automated testing platform; providing a test facility; receiving, by the testing cloud application, a job file of a test; connecting the test facility to the testing cloud application; publishing job data prescribed in the job file of the test to the test facility, wherein the job data configures the test facility to perform at least one test of a device or service under test and synchronizes a plurality of elements of the test; receiving, by the testing cloud application, result data from the test facility, which has performed at least one of the plurality of elements of the test; and generating a report of the result data.

20 Claims, 10 Drawing Sheets

FIG. 8
⎡ 800

```
# Test template definition
# Creator: Developer via API

# API Endpoints:
#    * POST /api/templates
#       * body:
#          environment_variables:
#             - param1
#             - param2
#          data_upload_mode: stream
#          job_templates:
#             <template_here>
#    * GET /api/templates
#    * GET /api/templates/{{template_id}}

# Events Created:

# Notes:

_id: test-template-id
environment_variables:
   - wifi_one_ssid
   - wifi_one_passphrase
   - wifi_two_ssid
   - wifi_two_passphrase
data_upload_mode:
   enum: ["stream", "per_iteration", "per_series"]
job_templates:
   # TODO: Make another job type?
   - job_type: web_surfing
     setup:
       steps:
         - operation: wifi.connect
           duration: 30
           params:
             ssid: {{wifi_one_ssid}}
             passphrase: {{wifi_one_passphrase}}
     before:
       steps: {}
     beforeEach::
       steps:
         - operation: wifi.connect
           duration: 15
           params:
             ssid: {{wifi_two_ssid}}
             passphrase: {{wifi_two_passphrase}}
```

TO FIG. 8 cont.

```
test:
    steps: []
      - operation: browser.site.nbc.clickHeadlineArticle
        duration: 60
afterEach:
    steps: []
      - operation: wifi.disconnect
        duration: 15
after:
    steps:
      - operation: wifi.connect
        duration: 30
        params:
            ssid: {{wifi_one_ssid}}
            passphrase: {{wifi_one_passphrase}}
```

```
# Test definition
# Creator: Developer
# API Endpoints:
#    * POST /api/templates/{{template_id}}/definitions
#        * body:
#            iterations: 50
#            jobs:
#              ...
#    * GET /api/templates/{{template_id}}/definitions
#    * GET /api/templates/{{template_id}}/definitions/{{definition_id}}

# Events Created:
# Notes:

_id: test-definition-id reference template
test_template_id: _id
iterations: 100 jobs:
  - job_type: web_surfing
    client_count: 2
```

FIG. 10

```
# environment definition
# Creator: Developer

# API Endpoints:
#   * GET /api/environments
#   * GET /api/environments/{{environment_id}}
#   * PATCH /api/environments
#   * POST /api/environments
#     * body:
#       variables:
#         <data in schema>
#       exclusive_tags:
#         <data in schema>
#       jobs:
#         <data in schema>

# Notes:
_id
  type: ObjectId
variables:
  - wifi_one_ssid: Jason's Network
  - wifi_one_passphrase: yolo1234
  - levl_user: ET
  - levl_pass: charter-levl-pass exclusive_tags:
  - op: equals
    key: network
    value: matt's big network
  - op: equals
    key: network
    value: ethan's big network
jobs:
  # job 1
  - type: mac_randomization
    - op: equals
      key: name
      value: living room pi
    - op: equals
      key: network
      value: matt's big network
```

TO FIG. 10 cont.

```
# job 2
- type: connected_client
  - client_tag_filter:
    - op: equals
      key: name
      value: bedroom iPad
    - op: equals
      key: network
      value: matt's big network
# job 3
- job_type: levl_api_query
  - client_tag_filter: []
```

```
# Series definition
# Creator: Developer
# API Endpoints:
#   * POST /api/series/
#     * body:
#         test_definition_id: _id
#         environment_id: _id
#   * GET /api/series/

# Events Created:

# Notes:
#   - Ensures clients are available
#   - Reserves clients
- Creates all client jobs series definition
_id: series-definition-id status: running
  enum:
    - "pending"
    - "setup"
    - "running"
    - "parsing_data"
    - "finished"
jobs:
  - job_id: _id
  - job_id: _id
  - job_id: _id
```

MULTI-CLIENT ORCHESTRATED AUTOMATED TESTING PLATFORM

FIELD OF THE INVENTION

The present invention relates generally to the electrical, electronic and computer arts, and, more particularly, to an automated testing platform configured to evaluate various technologies.

BACKGROUND OF THE INVENTION

Technological devices and services, which may consume and/or provide data, are being deployed to ever more complex data communication environments. Performance evaluations of these device and services with the environments, for example, to test the speed of a cloud service and compare the speed to a speed advertised a provider, can be useful. The variety of different devices, services, and standards (e.g., communication protocols) within these environments can make performance evaluations and comparisons difficult.

SUMMARY OF THE INVENTION

Principles of the invention provide techniques for operating an automated testing platform. In one aspect, an exemplary method for operating an automated testing platform includes providing a testing cloud application running on the automated testing platform; providing a test facility; receiving, by the testing cloud application, a job file of a test; connecting the test facility to the testing cloud application; publishing job data prescribed in the job file of the test to the test facility, wherein the job data configures the test facility to perform at least one test of a device or service under test and synchronizes a plurality of elements of the test; receiving, by the testing cloud application, result data from the test facility, which has performed at least one of the plurality of elements of the test; and generating a report of the result data.

An automated testing platform system includes a test facility; an application program interface storing a job file; a transport orchestrator configured provide the job file to the test facility, wherein the job file includes synchronized elements of a test to be performed by the test facility on a device under test; and a data processor configured to receive test data from the test facility, create a report using the test data, and publish the report to the application program interface as a resource.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine-readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. Some embodiments may not have these potential advantages and these potential advantages are not necessarily required of all embodiments. For example, one or more embodiments of the invention achieve one or more of:

abstracted management of a test facility;
synchronized test elements performed across a test facility that can be periodically offline and disconnected from an orchestrator during test execution;
quality assurance testing, evaluations, and integration tests can be performed repeatedly to collect data efficiently and effectively.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 8 is an example test template definition, in accordance with an example embodiment;

FIG. 9 is an example new test definition, in accordance with an example embodiment;

FIG. 10 is an example environment definition, in accordance with an example embodiment; and FIG. 11 is an example test series definition, in accordance with an example embodiment.

Figure 1:
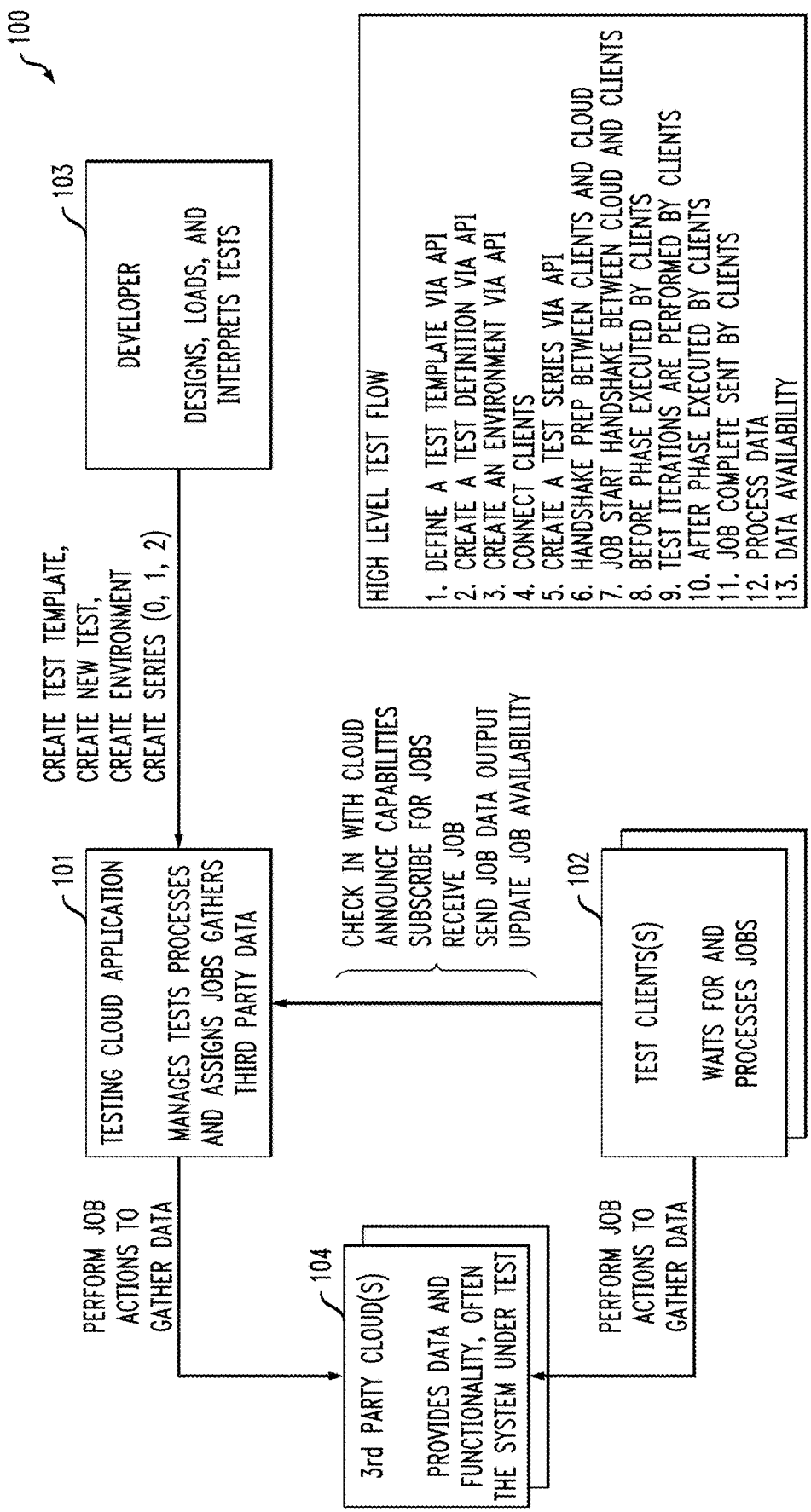
FIG. 1 is a functional block diagram of an exemplary testing application, useful within an exemplary testing system, in accordance with an example embodiment.

It is to be appreciated that elements in the figures are illustrated for simplicity and clarity. Common but wellunderstood elements that may be useful or necessary in a commercially feasible embodiment may not be shown in order to facilitate a less hindered view of the illustrated embodiments.

DETAILED DESCRIPTION OF PREFERRED EMBODIMENTS

Embodiments of the present invention are related to apparatus, systems, and methods for an automated testing platform. According to some embodiments, the automated testing platform captures data in a consistent manner over time (persistent) for quality assurance in performance testing of devices and/or services. For example, in a case where a vendor updates a device (or service), the automated testing platform can compare the performance of the device to vendor claims (about performance), compare the performance of the device to previous performance profiles of the device (i.e., before the update), compare the performance of the device to the performance of other devices known to the automated testing platform, and the like.

According to example embodiments, a framework automates a test processes for evaluating one or more technologies. Example embodiments include a framework that automates a test process configured to evaluate disparate components.

Consider the following example implementation where a developer (or other user) wants to evaluate a 3rd party application that claims to perform device fingerprinting. This application is configured to generate a connection alert to a homeowner's device whenever a device (e.g., a test client) connects or disconnects to a home's network. The application is further configured to generate a history alert about whether the test client has been connected to the network before on a device connection event. According to at least one example, the history alert is included in the connection alert so that a single alert includes the connection information and the history information. In the example, the user wants to conduct a test where a new device (a first test client), "Alice's phone," is connected to the network and disconnected after one minute. After another minute passes, Alice's phone is to be reconnected to the network and disconnected after one additional minute. In this scenario, the user expects to receive four alerts (in the case of the combined connection/history alert) from the application, as follows:

1. time=0 seconds
   a. Alice's phone has connected to the network
   b. This device has never connected to the network before
2. time=60 seconds
   a. Alice's phone has disconnected from the network
3. time=120 seconds
   a. Alice's phone has reconnected to the network
   b. This device has been on the network before
4. time=180 seconds
   a. Alice's phone has disconnected from the network In this example scenario, the user wants to correlate several data sources (e.g., multiple test clients) to understand the usefulness of the application. The user may want to know if the alerts are correct (i.e., in steps 1 and 3, does the application correctly recognize if the device has been on the network before?). Additionally, the user may want to know about how long it takes for the application to process the event (i.e., when Alice's phone connects to the network for the first time at time=0, is the homeowner alerted at time=1 or time=10?).

Because the first test client, Alice's phone, is periodically connected to the network, an automated testing platform according to an example embodiment is configured to listen for the alerts from the application on a second test client, "Bob's server." The testing platform allows Alice's phone and Bob's server to execute this test as a team, with correlated timestamps between the two testing devices. This allows the data from both devices to be correlated after the test is completed. Additionally, because the test configuration is defined in code of the testing platform, the test can be executed multiple times, consecutively, to gain a richer data set; this functionality is built into the automated testing platform.

According to some embodiments, and as illustrated in the example block diagram 100 of FIG. 1, a testing cloud application 101, one or more test clients 102, a user 103 interfacing with the testing cloud application, e.g., through a server/computer, and a third party cloud 104 facilitate the synchronization of data and the ability for multiple test clients to be able to execute operations (e.g., testing the cloud 104) simultaneously. It should be understood that while a third-party cloud is described as a device under test (DUT), the DUT can be any device or service, internal or external to a test system.

According to an example embodiment, the testing cloud application 101 manages tests, processes and assigns jobs to the test clients 102, and gathers data from a device and/or service under test, such as the third party cloud 104.

According to an example embodiment, the test clients 102 wait for jobs from the testing cloud application 101 and processes jobs received from the testing cloud application 101. According to an example embodiment, the test clients 102 can perform various functions, including checking in with the third party cloud 104, announcing capabilities, subscribing for jobs, receiving jobs, sending job data output, and updating job availability. According to some embodiments, the test clients 102 are components of the testing cloud application 101.

According to an example embodiment, the third party cloud 104 can be a third party cloud. According to an example embodiment, the third party cloud 104 provides data and functionality, for example, to perform plugin executables/methods. According to an example embodiment, the third party cloud 104 can be the device under test.

According to an example embodiment, the user 103 designs and loads the tests, and interprets data returned by the other components (e.g., the testing cloud application 101, the test clients 102, and/or the third party cloud 104). According to an example embodiment, the user 103 can create a job file comprising, for example, a test template (see, for example, test template definition 800, FIG. 8), a new test (see, for example, test definition 900, FIG. 9), an environment (see, for example, environment definition 1000, FIG. 10), and a test series (see, for example, series definition 1100, FIG. 11).

It should be understood that the examples shown in FIGS. 8-11 are examples, and are not limiting. These and other embodiments of the test template, new test, environment, and test series definitions are contemplated.

Figure 2:
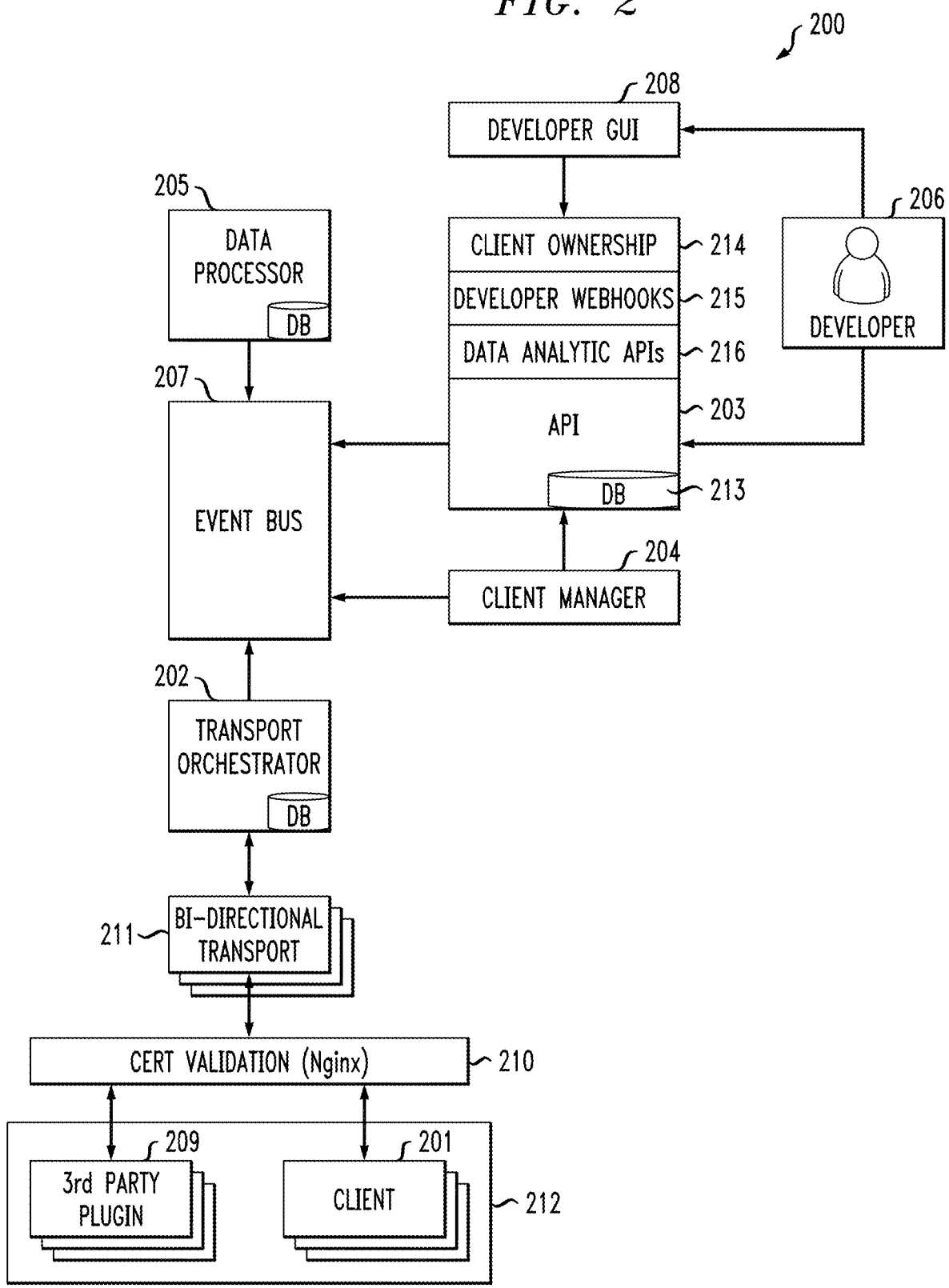
FIG. 2 is a functional block diagram of an exemplary testing system, in accordance with an example embodiment.

According to an example embodiment, and as illustrated in the example block diagram of FIG. 2, the automated testing platform 200 includes one or more test clients 201, a transport orchestrator 202, an Application Program Interface (API) 203, a client manager 204, and a data processor 205. According to an example embodiment, the components of the automated testing platform 200 enable the synchronization of data, and the ability for several test clients 201 to be able to execute operations simultaneously. According to at least one embodiments, these operations are applied against a DUT (e.g., a third party cloud).

According to some embodiments, the test clients 201 are devices that execute test operations and report results. One example of a test client 201 includes a Wi-Fi connected device (such as a phone or laptop) that can browse the internet or hop between different network connections. Another exemplary test client 201 includes a cloud-to-cloud adapter, integrating 3rd party APIs into test data. These and other test clients are contemplated within embodiments of the present invention.

According to some embodiments, the transport orchestrator 202 is configured for establishing and maintaining connections with the test clients 201. According to some embodiments, the transport orchestrator 202 is configured for routing messages between the DUT and a particular, uniquely addressable test client. According to some embodiments, the transport orchestrator 202 is configured to support multiple routing and transport protocols, allowing the testing cloud application to not be concerned with client specific transport protocols.

According to some embodiments, the API 203 is configured for storing test-related resources. This allows a user 206 to define the job file of test templates, tests, environment resources, and test series. According to some embodiments, the API 203 is configured to allow a user configuration to associate tags to test clients, which allows for test isolation and client specificity. According to at least one embodiments, the tags enable the user to claim a test client, direct the test client to perform an action (e.g., connect to WiFi network X), define an owner, etc. Test isolation refers to an ability to group test clients at a given location, such that, according to some embodiments, the number of jobs running at that location can be guaranteed to be one, e.g., the test job. According to some embodiments, tags with locations can be associated with the test clients and an isolation parameter for the given location. Client specificity refers to the addressability of test clients, e.g., through tagging, and enables the instruction (by the automated testing platform 200) of identified test clients to run certain tests.

According to some embodiments, the API 203 is configured to allow the user 206 to execute a test series, and retrieve data as the test results are reported/uploaded. The API 203 exposes the functionality to create and review comprehensive reports of test series data after a series (e.g., test client operations against the DUT) has finished executing. The API 203 exposes endpoints so the user 206 can claim test client ownership (if permitted by the test client), subscribe to cloud events (e.g., a test series has finished running), etc.

According to some embodiments, the client manager 204 is configured to ensure data about new test clients is stored in database, e.g., 213, available to the API 203, and that individual test client status updates are reflected in proper event streams (for example, "offline", "ready", "pending", "busy", etc.). According to some embodiments, the client manager 204 is configured to listen for heartbeats to establish if a client is currently offline or online, and to publish any change in status to an event bus 207.

According to some embodiments, the data processor 205 is configured to consume data from individual test clients 201 and, at the end of a series, create generic data reports overviewing the emitted events by the test clients 201. According to some embodiments, the data processor 205 is configured to read messages requesting more demanding or series-specific reports from the event bus 207, then process the data and create those reports. According to some embodiments, after a report is created, it is put onto the event bus 207 where the API 203 can consume it and store it as a resource.

According to an example embodiment, the automated testing platform 200 further includes a user-facing graphic user interface (GUI) 208 enabling the user 206 to create test templates, new tests, test environments, etc. According to an example embodiment, the GUI 208 enables access to the API 203. According to an example embodiment, the GUI 208 enables access to a client ownership module 214, developer webhooks 215, data analytic APIs 216, etc.

According to an example embodiment, the automated testing platform 200 connects to a DUT, such as the third-party cloud of FIG. 1, through one or more test facilities, e.g., 212. According to some embodiments, the test facility 212 includes one or more of a test client device 201 and plugin executables 209. According to some embodiments, the test client device 201, for example a computing device, can run the plugin executables 209.

According to some embodiments, the plugin executables 209 run on the data processor 205 of the automated testing platform 200, running the testing cloud application 101, and/or the test client(s) 201. In this example, the test facility 212 is internal to the automated testing platform 200. Accordingly, the testing cloud application 101 (see FIG. 1) can be configured within the automated testing platform 200 (e.g., configured to properly handle test client operations, challenges, requests, etc.).

According to some embodiments, the plugin executables 209 can have multiple jobs.

According to one or more embodiments, the third party clouds 104, or more generally a DUT, interacts with either the testing cloud application 101 or the test client(s) 102. These interactions can be implementation dependent.

Embodiments of the present invention can further make use of a certificate validation service module 210 and a transport server 211. According to some embodiments, the transport server 211 established connections to the test facility 212 via a bi-directional transport network and appropriate communication protocols, e.g., encrypted security protocols and the like. According to at least one embodiment, a certificate (e.g., a device fingerprint) is provided by each test client to the automated testing platform 200, where the certificate validation service module 210 validates and/or authenticates each test client.

Moreover, according to some embodiments, one or more of the transport orchestrator 202, the API 203, and the data processor 205 include, or have access to, a memory (e.g., a database (DB).

Figure 3:
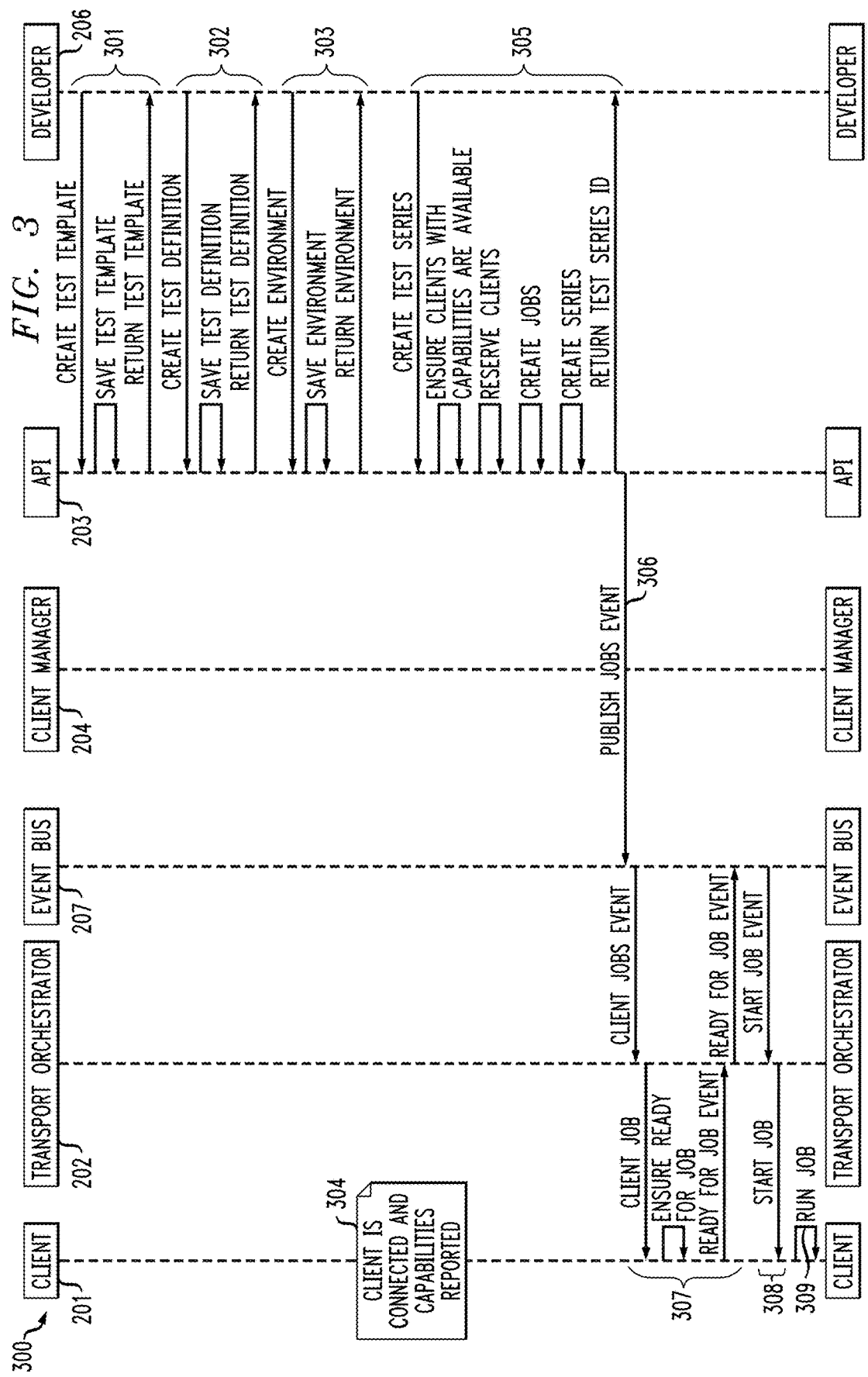
FIG. 3 is a sequence diagram showing a method of preparing a system to test a device in accordance with an example embodiment.

According to at least one embodiment, and referring to FIG. 3, a method 300 of operating an automated testing platform is presented in a case where a user 206 creates and runs a test using a client 201.

According to at least one embodiment, at step(s) 301, the user 206 defines a test template via the API 203. A test template defines the job types that will run as part of a test. A non-limiting example of a job type includes a test client configured to connect to, and 30 seconds later disconnect from, a DUT, such as an Access Point or other third party hardware under test. Another non-limiting example of a job type includes a test client configured to subscribe to a 3rd party cloud to receive alerts when a device connects or disconnects from an Access Point. Yet another non-limiting example of a job includes a test client configured to randomize its MAC address, connect to an Access Point, and disconnect from the Access Point 30 seconds later.

According to some embodiments, jobs, such as the non-limiting examples above, are defined in a Test Template. In one example, the three jobs are defined in the same test template in a case where they are part of the same test.

According to some embodiments, the test template can contain environmental variables that can be referenced in the job types (e.g., and defined in other documents). According to some embodiments, the test template defines the method in which test data will be sent to the DUT (e.g., cloud), which can be during the tests, after each test iteration, or after an entire test series.

According to at least one embodiment, at step(s) 302, the user 206 creates a test definition via the API 203. A test definition references a test template, and includes extra information that gives further context to the test template. For example, the test definition can define how many iterations of the test take place. Additionally, the test definition can specify how many test clients will be performing each job type (e.g., the user wants 4 clients to be connecting to the Access Point and disconnecting 30 seconds later).

According to at least one embodiment, at step(s) 303, the user 206 creates an environment via the API 203. According to some embodiments, the environment is created according to a defined context (or environmental variables) in which a test can take place. In one or more embodiments, the environment is created according to the environmental variables required by the test template, for example, an environment having one WiFi device on a Service Set Identifier (SSID) (e.g., "wifi_one_ssid"). According to some embodiments, the environmental variables can contain a list of "exclusive tags" used to ensure only one test is running on a test facility (e.g., a set of test clients); this is useful, for example, if a test consumes a large amount of bandwidth, and the user does not want other tests to be running on the network simultaneously. According to at least one embodiment, the user can configure a test client to perform jobs in parallel, and/or the conditions under which parallel jobs are permitted. According to some embodiments, the environmental variables can make references to job types, and use test client tags that ensure specific jobs run on specific test clients; this can be useful, for example, if the user wants the test client connecting to and from the DUT to be the test client with the tag: "room=bedroom".

According to at least one embodiment, at step(s) 304, the test clients 201 are powered on and running a client firmware or application that allows for communication with the testing cloud application (e.g., the event bus 207 and transport orchestrator 202). According to at least one embodiment, upon connection, the test clients 201 send metadata about themselves, which includes a list of capabilities, or operations that can be executed. According to some embodiments, the client manager 204 ensures each test client 201 has a status of "online" in the testing cloud application.

According to at least one embodiment, at step(s) 305, the user 206 creates a test series via API 203. According to at least one embodiment, the test series encapsulates a plurality of elements of a test, and an order in which the elements are to be performed. For example, one element may instruct a test client to connect to a DUT, while another element may instruct the test client to perform another function.

According to some embodiments, by creating the test series, the user 206 is instructing the testing cloud application to start the test. For example, the user 206 can send a reference to the test definition and the environment, which must already be created for a series to successfully be created. When a user 206 creates a test series, the API 203 ensures test clients 201 with the necessary capabilities (and tags, if applicable) are available to run the jobs at step(s) 306 (e.g., using a publishing jobs event through the client manager 204). The API 203 will then reserve the test clients 201 (if applicable) and create jobs for each test client, which defines the exact operations (with environment variables fully populated) the test client needs to perform. The API 203 associates all of these jobs with the series, and the newly created jobs are routed to the test client 201 where the job needs to run.

According to at least one embodiment, at step(s) 307, a handshake is performed between test clients 201 and the testing cloud application. According to at least one embodiment, the test clients 201 acknowledge when they have received the job and wait for the signal from the testing cloud application to start executing job operations. The testing cloud application correlates all of the client acknowledgments and waits for all clients to check in and report that they are ready to start executing job operations.

According to at least one embodiment, at step(s) 308, a job start handshake is initialized between the testing cloud application and the test clients 201. The testing cloud application signals to every test client to begin processing job operations. According to at least one embodiment, from this point onwards, the test clients do not need to be connected to the testing cloud application and can still be processing a job at step(s) 309.

According to at least one embodiment, at step(s) 309, before job execution by the test clients 201, each test client 201 executes the "before" section of its job file. This section will get the test client 201 to a state where it is ready to perform a test section of the job file (e.g., if a test client 201 must first connect to an Access Point (the DUT in this example) then disconnect 30 seconds later during a test, the test client 201 would disconnect from the Access Point during this step so it can connect during the test). According to at least one embodiment, there is a specified duration in the job file.

According to at least one embodiment, at step(s) 309, test iterations are performed by the test clients 201. According to some embodiments, each test client 201 executes the operations defined in the "beforeEach," "Test," and "afterEach" section of its job file the number of times specified by the "iterations" fields of the job file. According to some embodiments, each of these sections has a specified duration in the job file.

According to at least one embodiment, and again at step(s) 309, the "afterEach" section is executed by the test clients 201. According to some embodiments, each test client 201 executes the "afterEach" section of the job file. According to some embodiments, this section will get the test client 201 to a normal state (e.g., the test client 201 connected to the internet and the testing cloud application). According to at least one embodiment, the test clients 201 send data during this phase. According to at least one embodiment, the "afterEach" section has a specified duration in the job file.

Figure 4:
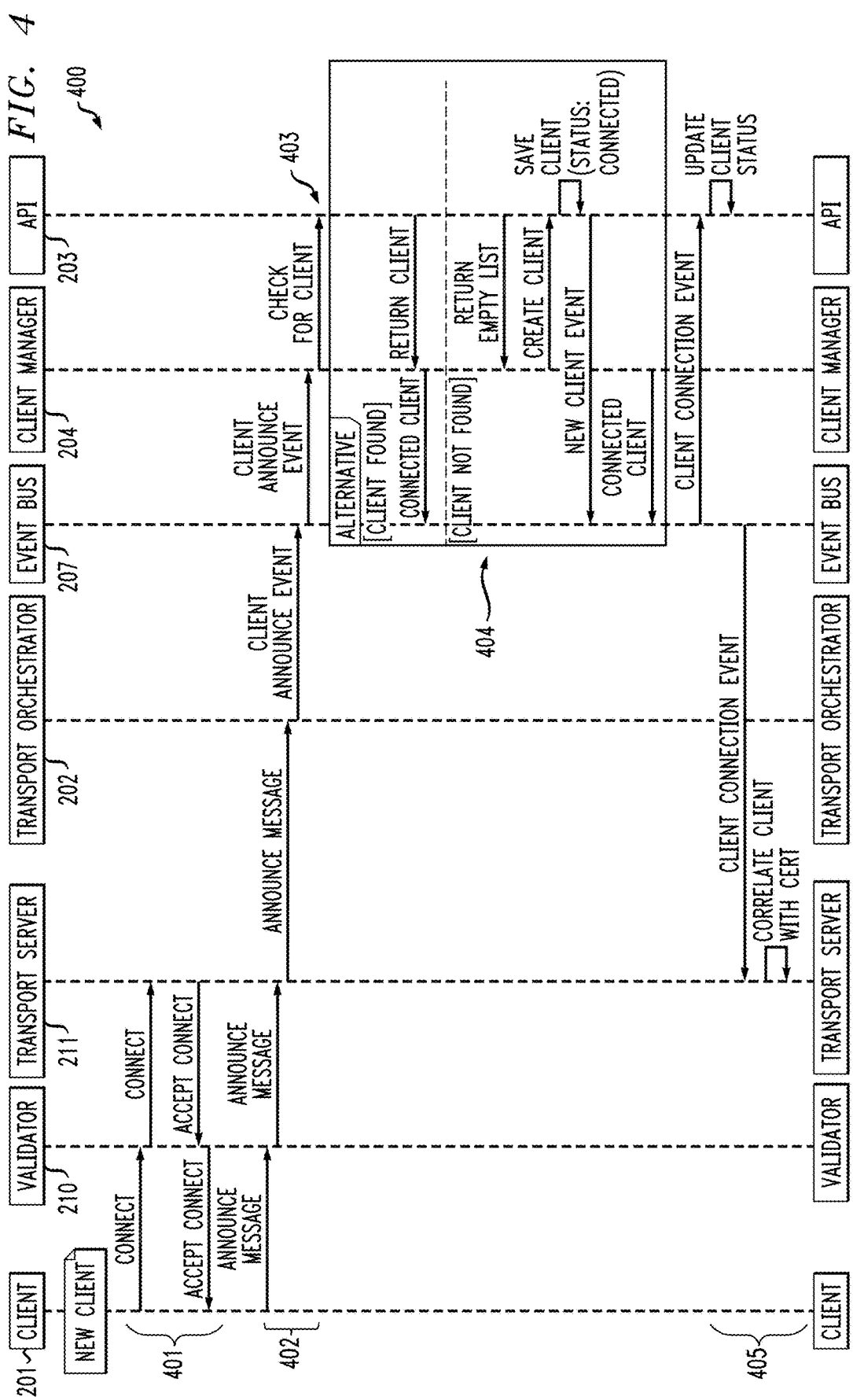
FIG. 4 is a sequence diagram showing a method of initializing a test client for running a job in accordance with an example embodiment.

FIG. 4 is a sequence diagram showing a method of initializing a test client connecting to the testing cloud application 400 in advance of running a job in accordance with an example embodiment. According to some embodiments, at bracket 401 the test client 201 provides a certificate to the certificate validation service module 210, such that the test client 201 is recognized by the transport server 211 of the testing cloud application, and an encrypted tunnel between the testing cloud application and the test client can be established. According to at least one embodiment, at bracket 402 the test client may transmit an announcement of available functions, processes, abilities, etc., to the plugin executable, device type (of the test client), etc., indicating to the testing cloud application that the test client is ready for a job. According to some embodiments, at event 403 the API 203 ensures that a test client database is accessible, where the test client database is populated with, for example, tags associated with the test clients 201, the functions of each test client exposed as capabilities, a status of each test client (e.g., connected, ready), etc. According to some embodiments, at event(s) 404, a request to connect the test client to the testing cloud application is transmitted by the client manager 204 to the event bus 207, and the test client's status (e.g., status: connected) is stored in the test client database. According to at least one embodiments, at bracket 405 the status of the test client is finalized in a client connection event and a connection with the test client is established via the transport orchestrator 202 and transport server 211.

Figure 5:
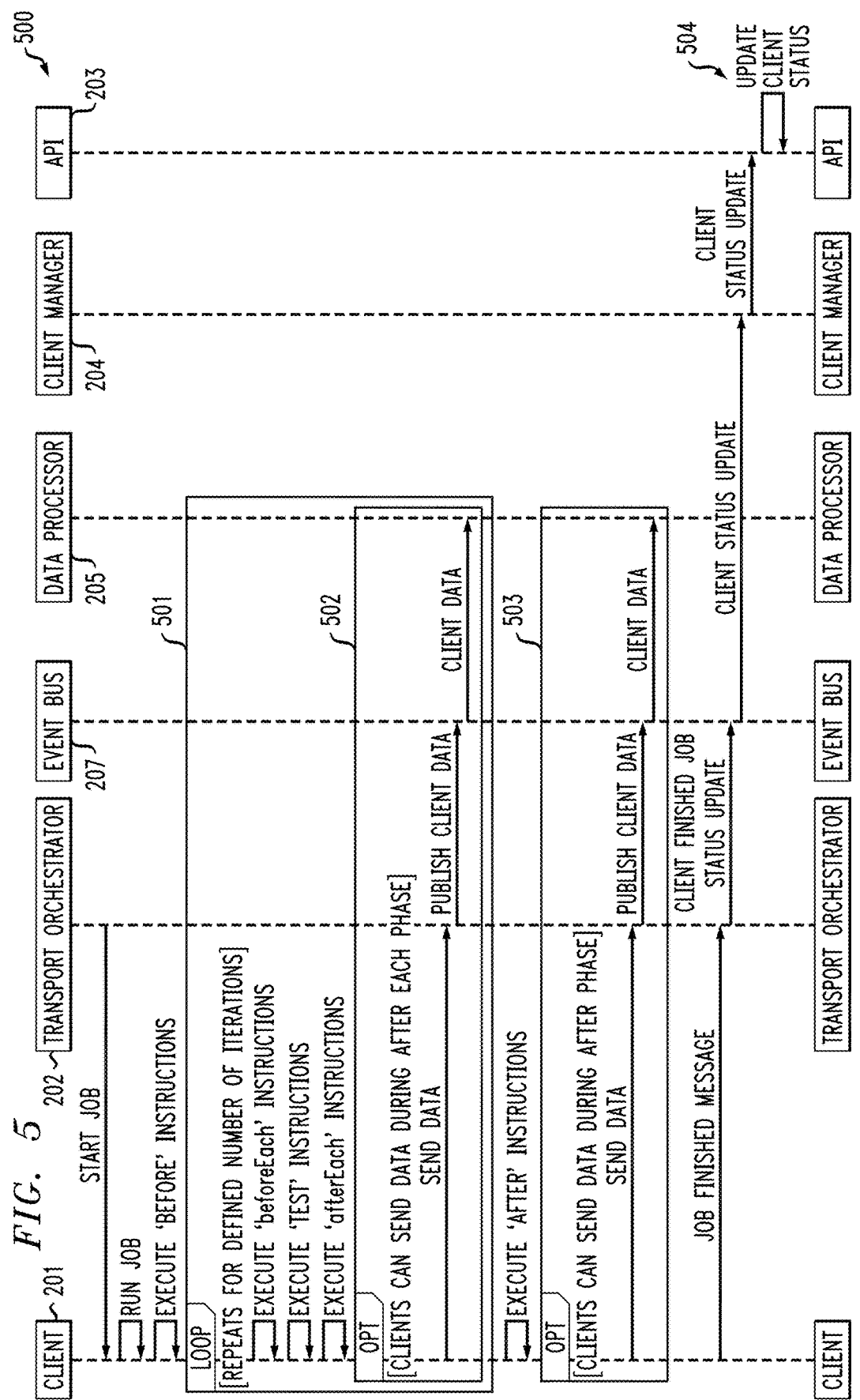
FIG. 5 is a sequence diagram showing a method of a test client reporting data in accordance with an example embodiment.

FIG. 5 is a sequence diagram showing a method 500 of a test client reporting data in accordance with an example embodiment. Referring to FIG. 5, "job complete" status reports can be sent by test clients to the testing cloud application according to some embodiments of the present invention. According to at least one embodiment, the test clients send test results data to the testing cloud application and send a message to report that all operations for a job have been completed. Test clients may report this information during a job, e.g., after each iteration 501 and/or after a certain phase of the job (test) 502. Test clients may report this information after completing a job 503, for example, in a case where the test clients do not have a connection to the testing cloud application during the test. According to at least one embodiment, the test client 201 sends test data to the transport orchestrator 202, which publishes the test data to the event bus 207 and data processor 205 to further processing. According to some embodiments, the testing cloud application marks related resources as appropriate (e.g., the testing cloud application may remove the job from a test client document, update test client status, etc.) at step(s) 504.

According to at least one embodiment, data reports are automatically created by the data processor 205 upon the completion of a test or test series. According to at least one embodiment, the data processor 205 creates and publishes the report to the event bus 207 for interested parties, such as the user 206. The API 203, for example, can consume the report and make it available to the user 206. According to at least one embodiment, data reports are created by the data processor in response to a request by the user to the API, for example, where the user requests a specific or detailed data report. This may be a request by the user to the API, where the request is published to the event bus, read by the data processor, and the data processor then publishes the report to the event bus.

According to at least one embodiment, test data is available to the user 206. According to some embodiments, reports automatically created by the data processor 205 are also available. The test series can be marked as complete (e.g., in the test client database) by the testing cloud application. According to some embodiments, the user 206 can run a new test series with the same test definition and the environment (as desired); that is, tests are repeatable using prior test definitions. According to some embodiments, the user 206 can modify and run a new test series with the modified context. For example, the API 203 enables user access to a database 213 storing test definitions, enables the user to develop and/or store new test definitions, enables the user to analyze test results, e.g., using data analytic APIs 216 provided by the API 203, etc. According to some embodiments, the automated testing platform 200

Recapitulation

Figure 6:
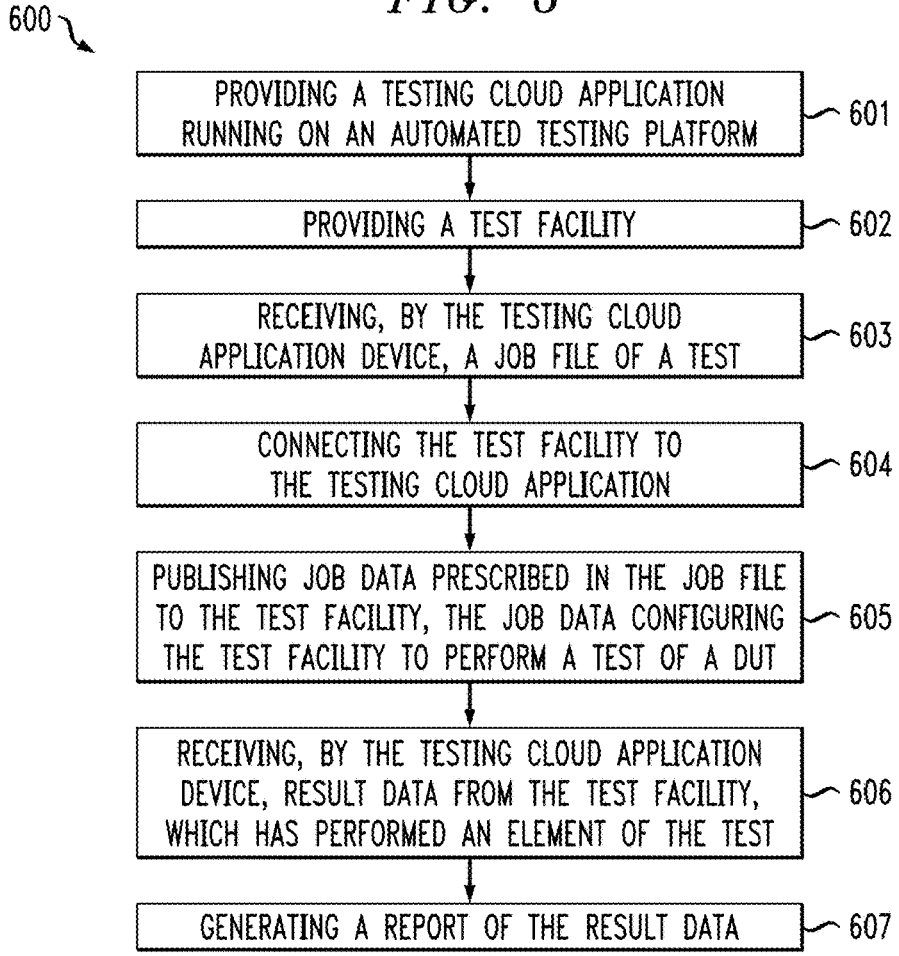
FIG. 6 is a flow diagram of a method of operating a test system in accordance with an example embodiment.

Given the discussion thus far, it will be appreciated that, in general terms, an exemplary method for operating an automated testing platform 600 (see FIG. 6), according to an aspect of the invention, includes the steps of providing a testing cloud application running on the automated testing platform 601; providing a test facility 602; receiving, by the testing cloud application, a job file of a test 603; connecting the test facility to the testing cloud application 604; publishing job data prescribed in the job file of the test to the test facility, wherein the job data configures the test facility to perform at least one test of a device or service under test and synchronizes a plurality of elements of the test 605; receiving, by the testing cloud application, result data from the test facility, which has performed at least one of the plurality of elements of the test 606; and generating a report of the result data 607.

An automated testing platform 200 system includes a test facility 212; an application program interface (API) 203 storing a job file; a transport orchestrator 202 configured provide the job file to the test facility, wherein the job file includes synchronized elements of a test to be performed by the test facility on a device under test; and a data processor 205 configured to receive test data from the test facility, create a report using the test data, and publish the report to the application program interface as a resource.

The invention can employ hardware aspects or a combination of hardware and software aspects. Software includes but is not limited to firmware, resident software, microcode, etc. One or more embodiments of the invention or elements thereof can be implemented in the form of an article of manufacture including a machine-readable medium that contains one or more programs which when executed implement one or more method step(s) as disclosed herein; that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 7:
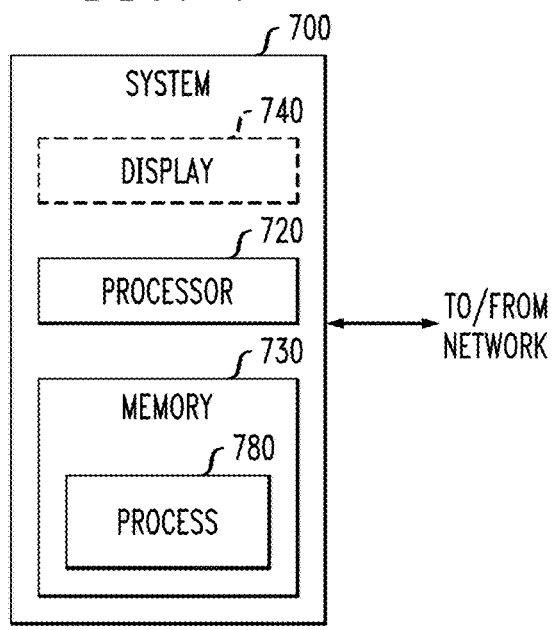
FIG. 7 is a block diagram of a computer system useful in connection with one or more aspects of the invention.

FIG. 7 is a block diagram of at least a portion of an exemplary system 700 that can be configured to implement at least some aspects of the invention, and is representative, for example, of one or more of the client(s), server(s), apparatus or modules shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for operating an automated testing platform comprising:
    providing a testing cloud application running on the automated testing platform, wherein the testing cloud application comprises an application program interface, an event bus, and a transport orchestrator;
    providing a test facility;
    receiving, by the testing cloud application, a job file of a test;
    receiving, by the application program interface, the job file of the test;
    connecting the test facility to the testing cloud application;
    publishing job data prescribed in the job file of the test to the test facility, wherein the job data configures the test facility to perform at least one test of a device or service under test and synchronizes a plurality of elements of the test while the test facility is at least periodically offline and is disconnected from the orchestrator during test execution;

publishing, by the event bus, a jobs event signaling to the test facility to begin the test;

receiving, by the transport orchestrator, the jobs event;

performing a handshake with the test facility to begin the test; receiving, by the testing cloud application, result data from the test facility, which has performed at least one of the plurality of elements of the test; and generating a report of the result data.

2. The method of claim 1, wherein the job file of the test is received from a user via the application program interface of the automated testing platform.

3. The method of claim 1, wherein the job file of the test comprises:
    a test template defining job types to be run by the test facility;
    a test definition defining a number of the test facilities and a number of iterations of the test;
    at least one environment variable to be embodied by the test facility and required by the test template; and
    a test series controlling the synchronization of the plurality of elements performed by the test facility.

4. The method of claim 1, wherein the job data synchronizes a first element, of the plurality of elements, performed by the test facility with a second element, of the plurality of elements, performed by a second test facility performing the at least one test of the device or service under test, and wherein the result data is synchronized at least due to the synchronization of the test facilities.

5. The method of claim 1, wherein the test facility is a test client device external to the automated testing platform, the method further comprising:
    loading a plugin executable on the test client; and
    running the plugin executable on the test facility to perform the test.

6. The method of claim 1, further comprising:
    receiving a certificate from the test facility; and
    validating the certificate received from the test facility, wherein the certificate is validated prior to connecting the test facility to the testing cloud application.

7. A non-transitory computer readable medium comprising computer executable instructions which when executed by a computer cause the computer to perform a method for operating an automated testing platform comprising:
    providing a testing cloud application running on the automated testing platform, wherein the testing cloud application comprises an application program interface, an event bus, and a transport orchestrator;
    providing a test facility;
    receiving, by the testing cloud application, a job file of a test;
    receiving, by the application program interface, the job file of the test;
    connecting the test facility to the testing cloud application;
    publishing job data prescribed in the job file of the test to the test facility, wherein the job data configures the test facility to perform at least one test of a device or service under test and synchronizes a plurality of elements of the test while the test facility is at least periodically offline and is disconnected from the orchestrator during test execution;
    publishing, by the event bus, a jobs event signaling to the test facility to begin the test;
    receiving, by the transport orchestrator, the jobs event;
    performing a handshake with the test facility to begin the test;
    receiving, by the testing cloud application, result data from the test facility, which has performed at least one of the plurality of elements of the test; and
    generating a report of the result data.

8. The non-transitory computer readable medium of claim 7, wherein the job file of the test is received from a user via the application program interface of the automated testing platform.

9. The non-transitory computer readable medium of claim 7, wherein the job file of the test comprises:
    a test template defining job types to be run by the test facility;
    a test definition defining a number of the test facilities and a number of iterations of the test;
    at least one environment variable to be embodied by the test facility and required by the test template; and
    a test series controlling the synchronization of the plurality of elements performed by the test facility.

10. The non-transitory computer readable medium of claim 7, wherein the job data synchronizes a first element, of the plurality of elements, performed by the test facility with a second element, of the plurality of elements, performed by a second test facility performing the at least one test of the device or service under test, and wherein the result data is synchronized at least due to the synchronization of the test facilities.

11. The non-transitory computer readable medium of claim 7, wherein the test facility is a test client device external to the automated testing platform, the method further comprising:
    loading a plugin executable on the test client; and
    running the plugin executable on the test facility to perform the test.

12. The non-transitory computer readable medium of claim 7, further comprising:
    receiving a certificate from the test facility; and validating the certificate received from the test facility, wherein the certificate is validated prior to connecting the test facility to the testing cloud application.

13. The method of claim 1, further comprising configuring the automated testing platform to perform the test based on one or more environmental variables specified by a test template, at least one environmental variable defining limitations for executing a given test.

14. The method of claim 1 further comprising configuring the automated testing platform to perform the test based on one or more environmental variables specified by a test template, at least one environmental variable defining a context in which a given test is to be performed, wherein at least one of the environmental variables comprises a list of one or more exclusive tags used to ensure only one test is running on the test facility due to bandwidth restrictions.

15. An automated testing platform system comprising:
    a memory; and at least one processor, coupled to the memory, and operative to:
    provide a testing cloud application running on an automated testing platform, wherein the testing cloud application comprises an application program interface, an event bus, and a transport orchestrator;
    facilitate providing a test facility;
    receive, by the testing cloud application, a job file of a test;
    receive, by the application program interface, the job file of the test;
    connect the test facility to the testing cloud application;
    publish job data prescribed in the job file of the test to the test facility, wherein the job data configures the test facility to perform at least one test of a device or service under test and synchronizes a plurality of elements of the test while the test facility is at least periodically offline and is disconnected from the orchestrator during test execution;

publish, by the event bus, a jobs event signaling to the test facility to begin the test;

receive, by the transport orchestrator, the jobs event;

perform a handshake with the test facility to begin the test;

receive, by the testing cloud application, result data from the test facility, which has performed at least one of the plurality of elements of the test; and generate a report of the result data.

16. The system of claim 15, wherein the job file of the test is received from a user via the application program interface of the automated testing platform.

17. The system of claim 15, wherein the job file of the test comprises:

a test template defining job types to be run by the test facility;

a test definition defining a number of the test facilities and a number of iterations of the test;

at least one environment variable to be embodied by the test facility and required by the test template; and a test series controlling the synchronization of the plurality of elements performed by the test facility.

18. The system of claim 15, wherein the job data synchronizes a first element, of the plurality of elements, performed by the test facility with a second element, of the plurality of elements, performed by a second test facility performing the at least one test of the device or service under test, and wherein the result data is synchronized at least due to the synchronization of the test facilities.

19. The system of claim 15, wherein the test facility is a test client device external to the automated testing platform, the method further comprising:

loading a plugin executable on the test client; and running the plugin executable on the test facility to perform the test.

20. The system of claim 15, wherein the at least one processor is further operative to:

receive a certificate from the test facility; and validate the certificate received from the test facility, wherein the certificate is validated prior to connecting the test facility to the testing cloud application.

* * * * *